United States Patent [19]

Manning et al.

[11] 4,084,161

[45] Apr. 11, 1978

[54] HEAT RESISTANT RADAR ABSORBER

[75] Inventors: William P. Manning; Walter T. Passiuk, both of Tulsa, Okla.

[73] Assignee: The United States of America as represented by the Secretary of the Army, Washington, D.C.

[21] Appl. No.: 48,619

[22] Filed: May 26, 1970

[51] Int. Cl.[2] .......................... C09J 5/02; H01Q 17/00

[52] U.S. Cl. .................................. 343/18 A; 156/308

[58] Field of Search ....................... 343/18 A; 156/308

[56] References Cited

U.S. PATENT DOCUMENTS

| | | | |
|---|---|---|---|
| 2,828,484 | 3/1958 | Skellett | 343/18 A |
| 2,920,174 | 1/1960 | Haagensen | 343/18 A |
| 2,956,281 | 10/1960 | McMillan et al. | 343/18 A |
| 2,992,426 | 7/1961 | Borcherdt | 343/18 A |
| 2,996,709 | 8/1961 | Pratt | 343/18 A |

*Primary Examiner*—Malcolm F. Hubler

*Attorney, Agent, or Firm*—Nathan Edelberg; Robert P. Gibson; James T. Deaton

[57] ABSTRACT

A foamed ceramic slab is bonded to a three-layer polyimide RAM substrate to produce a radar absorber capable of at least 10db absorptivity of the range 3 to at least 10 GHZ and of withstanding very high temperatures, for example, 3,000° F for 80 seconds or 900° F for 10 minutes, while weighing only about 5.0 lbs/sq. ft.

3 Claims, No Drawings

HEAT RESISTANT RADAR ABSORBER

BACKGROUND OF THE INVENTION

This invention relates to RAM (Radar Absorptive Material) systems, particularly to those required to resist high temperatures for significant periods of time.

Current radar absorbers are usually of the sandwich or graded dielectric type. The sandwich type absorbers utilize conductive films spaced from a ground plane; the overall impedance of the system is adjusted to match that of free space as nearly as possible. Graded dielectric absorbers consist of a series of layers having increasing dielectric and loss constants for absorbing incident radar energy with minimum reflection at the front surface and the intermediate interfaces. In either case, the absorbers have been constructed from resinous organic materials that cannot resist temperatures above 1000° F for any significant period of time and from ceramic materials that are excessively heavy. A lightweight, heat resistant radar absorber is needed, especially for use in re-entry vehicles.

SUMMARY OF THE INVENTION

This invention comprises a ceramic thermal barrier bonded to an organic RAM substrate to provide a lightweight absorber capable of temporarily withstanding high temperatures. In one example of this invention, a foamed ceramic slab no thicker than 0.5 inches in bonded to a three-layer polyimide RAM substrate no thicker than 0.8 inches to produce an absorber capable of at least 10db absorptivity over the range 3 to at least 10 GHZ ($10 \times 10^9$ hertz) and of withstanding 3000° F for 80 seconds or 900° F for 10 minutes, while weighing only about 5.0 lbs/sq. ft., 2 lbs./sq. ft. lighter than a comparable all-ceramic system. The foamed ceramic slab is formed from foamed ceramic blocks and bonded to the polyimide sustrate by the process comprising the steps of:

1. hand-mixing a ceramic adhesive consisting of 63% by weight of a mixed oxide powder ($SiO_2$, $ZrO_2$), 33% by weight of a 30% solution of sodium silicate, and 4% by weight of Kaowool fibers;
2. covering with a removable plastic film the polyimide substrate surface to which said ceramic blocks are to be bonded;
3. positioning said ceramic blocks on said plastic film so as to approximate a single slab;
4. beveling the adjoining surfaces of said ceramic blocks to fit said ceramic blocks into a single slab having approximately the same contour as said substrate surface;
5. applying said ceramic adhesive in excess to two of said adjoining beveled ceramic block surfaces, squeezing said blocks together to form a 1/16 inch ceramic adhesive joint, and scraping off the excess;
6. repeating step 5 until all of said ceramic blocks are joined together into a single slab;
7. placing the substrate-plastic film-ceramic slab assembly into a vacuum bag, applying vacuum pressure, and curing for 16 hours at room temperature and 3 hours at 150° F;
8. removing said assembly from said vacuum bag and separating said ceramic slab, plastic film, and substrate;
9. cleaning the ceramic slab surface which is to be bonded to said substrate, lightly sanding said ceramic slab surface and wiping off the resulting dust;
10. cleaning and wiping with solvent said substrate surface;
11. applying thixotropic polyimide adhesive to said ceramic slab surface, working said thixotropic polyimide adhesive into the pores of said ceramic slab surface, scraping off the excess, and curing for 2 hours at room temperature, 1 hour at 15° F, 1 hour at 350° F, and ½ hour at 400° F;
12. applying a thin film of said thixotropic polyimide adhesive to said substrate surface and curing as in step 11;
13. applying at least one layer of said thixotropic polyimide adhesive to said substrate surface;
14. positioning said ceramic slab on said polyimide substrate in the same relation as in step 4;
15. placing said polyimide substrate with said ceramic slab in said position into a vacuum bag and curing at 26 inches Hg pressure for ½ hour at 200° F, ½ hour at 250° F, ½ hour at 300° F, and 1 hour at 400° F;
16. post-curing the product of step 15 in a restraining press for ½ hour at 400° F, 1 hour at 500° F, 2 hours at 600° F, 1 hour at 650° F, and 1 hour at 700° F, and cooling to room temperature in said press.

DESCRIPTION OF THE PREFERRED EMBODIMENT

Many embodiments of this invention having varying degrees of practicability are possible. The substrate may be either the sandwich or graded dielectric type using an RAM chosen for the particular application. For very high temperature applications, polyimide, polypropylene oxide, polybenzamide resins, or other high temperature resistant organic resins are possible. Phenolic resins could be used if the substrate-ceramic interface temperature does not exceed 400° F. Similarly several types of ceramic thermal barriers are possible The preferred embodiment comprises a 0.41 inch thick ceramic foam slab bonded to a 0.70 inch thick three-layer polyimide RAM substrate. Details of constructing foamed ceramic blocks and the polyimide RAM substrate are given in North American Aviation, Inc., Technical Report No. SID66T-44. The process of bonding the foamed ceramic blocks to the polyimide RAM substrate comprises the following steps:

1. hand-mixing a ceramic adhesive consisting of 63% by weight of a mixed oxide powder ($SiO_2$, $ZrO_2$), 33% by weight of a 30% solution of sodium silicate, and 4% by weight of Kaowool fibers;
2. covering with a removable plastic film the polyimide substrate surface to which said ceramic blocks are to be bonded;
3. positioning said ceramic blocks on said plastic film so as to approximate a single slab;
4. beveling the adjoining surfaces of said ceramic blocks to fit said ceramic blocks into a single slab having approximately the same contour as said substrate surface;
5. applying said ceramic adhesive in excess to two of said adjoining beveled ceramic block surfaces, squeezing said blocks together to form a 1/16 inch ceramic adhesive joint, and scraping off the excess;
6. repeating step 5 until all of said ceramic blocks are joined together into a single slab;
7. placing the substrate-plastic film-ceramic slab assembly into a vacuum bag, applying vacuum pressure, and curing for 16 hours at room temperature and 3 hours at 150° F;

8. removing said assembly from said vacuum bag and separating said ceramic slab, plastic film, and substrate;

9. cleaning the ceramic slab surface which is to be bonded to said substrate, lightly sanding said ceramic slab surface and wiping off the resulting dust;

10. cleaning and wiping with solvent said substrate surface;

11. applying thixotropic polyimide adhesive to said ceramic slab surface, working said thixotropic polyimide adhesive into the pores of said ceramic slab surface, scraping off the excess, and curing for 2 hours at room temperature, 1 hour at 15° F, 1 hour at 350° F, and ½ hour at 400° F;

12. applying a thin film of said thixotropic polyimide adhesive to said substrate surface and curing as in step 11;

13. applying at least one layer of said thixotropic polyimide adhesivve to said substrate surface;

14. positioning said ceramic slab on said polyimide substrate in the same relation as in step 4;

15. placing said polyimide substrate with said ceramic slab in said position into a vacuum bag and curing at 26 inches Hg pressure for ½ hour at 200° F, ½ hour at 250° F, ½ hour at 300° F, and 1 hour at 400° F;

16. post-curing the product of step 15 in a restraining press for ½ hour at 400° F, 1 hour at 500° F, 2 hours at 600° F, 1 hour at 650° F, and 1 hour at 700° F, and cooling to room temperature in said press.

A surface coating for the non-bonded surface of the ceramic foam slab is recommended for re-entry vehicle application. A suitable surface coating consists of 65 parts by weight of Metalfoam Corp. F-26, 35 parts by weight of Metalfoam Corp. H-26, and 12 parts be weight Kaowool fibers. The mixture is kneaded by hand and extruded through a 40 mesh screen, then a 60 mesh screen, onto the cleaned ceramic foam surface. The material is worked into the pores, the excess removed, and the surface smoothed in the manner used in the cementing finishing art. The assembly is then placed in a dust-free atmosphere and cured for 16 hours at room temperature, 2 hours at 150° F, 1 hour at 250° F, 1 hour at 300° F, 1 hour at 350° F, and 2 hours at 400° F.

We claim:

1. A radar absorber adapted for heat resistance comprising a ceramic thermal barrier bonded to an organic RAM substrate, said thermal barrier consisting of a foamed ceramic slab and said substrate consisting of a layered polyimide RAM.

2. The absorber in claim 1, said foamed ceramic slab having a thickness substantially no greater than 0.5 inches, and said polyimide substrate having a thickness substantially no greater than 0.8 inches, to provide heat protection up to 3000° F for 80 seconds and radar absorptivity of at least 10db over the range 3 to at least 10 GHt.

3. In the process of making a heat-resistant radar absorber, the process of bonding formed ceramic blocks to a polyimide RAM substrate, comprising the steps of:

a. hand-mixing a ceramic adhesive consisting of 63% by weight of a mixed oxide powder ($SiO_2$, $ZrO_2$), 33% by weight of a 30% solution of sodium silicate, and 4% by weight of Kaowool fibers;
b. covering with a removable plastic film the polyimide substrate surface to which said ceramic blocks are to be bonded;
c. positioning said ceramic blocks on said plastic film so as to approximate a single slab;
d. beveling the adjoining surfaces of said ceramic blocks to fit said ceramic blocks into a single slab having approximately the same contour as said substrate surface;
e. applying said ceramic adhesive in excess to two of said adjoining beveled ceramic block surfaces, squeezing said blocks together to form a 1/16 inch ceramic adhesive joint, and scraping off the excess;
f. repeating step 5 until all of said ceramic blocks are joined together into a single slab;
g. placing the substrate-plastic film-ceramic slab assembly into a vacuum bag, applying vacuum pressure, and curing for 16 hours at room temperature and 3 hours at 150° F;
h. removing said assembly from said vacuum bag and separating said ceramic slab, plastic film, and substrate;
i. cleaning the ceramic slab surface which is to be bonded to said substrate, lightly sanding said ceramic slab surface and wiping off the resulting dust;
j. cleaning and wiping with solvent said substrate surface;
k. applying thixotropic polyimide adhesive to said ceramic slab surface, working said thixotropic polyimide adhesive into the pores of said ceramic slab surface, scraping off the excess, and curing for 2 hours at room temperature, 1 hour at 15° F, 1 hour at 350° F, and ½ hour at 400° F;
l. applying a thin film of said thixotropic polyimide adhesive to said substrate surface and curing as in step k;
m. applying at least one layer of said thixotropic polyimide adhesive to said substrate surface;
n. positioning said ceramic slab on said polyimide substrate in the same relation as in step d;
o. placing said polyimide substrate with said ceramic slab in said position into a vacuum bag and curing at 26 inches Hg pressure for ½ hour at 200° F, ½ hour at 250° F, ½ hour at 300° F, and 1 hour at 400° F;
p. post-curing the product of step o in a restraining press for ½ hour at 400° F, 1 hour at 500° F, 2 hours at 600° F, 1 hour at 650° F, and 1 hour at 700° F, and cooling to room temperature in said press.

* * * * *